United States Patent [19]
May

[11] Patent Number: 5,419,373
[45] Date of Patent: May 30, 1995

[54] FILTER SUPPORT TUBE FOR A FILTER CARTRIDGE

[76] Inventor: Clifford H. May, 702 S. Muskogee St., Sapulpa, Okla. 74066

[21] Appl. No.: 735,853

[22] Filed: Jul. 25, 1991

[51] Int. Cl.$^6$ .................. F16L 55/24; B01D 29/11
[52] U.S. Cl. .................... 138/108; 138/132; 138/174; 210/437; 210/484; 210/485; 210/493.1
[58] Field of Search .............. 210/493.1, 485, 437, 210/484; 138/131, 134, 132, 108, DIG. 8, 113, 139

[56] References Cited

U.S. PATENT DOCUMENTS

| | | | |
|---|---|---|---|
| 420,136 | 1/1890 | Willis | 210/457 |
| 1,601,437 | 9/1926 | Gustafson | 210/437 |
| 1,861,576 | 6/1932 | Liddell | |
| 1,958,268 | 5/1934 | Goldman | 210/183 |
| 2,613,814 | 10/1952 | Moore | 210/148 |
| 2,670,852 | 3/1954 | Davidson | 210/165 |
| 2,703,650 | 3/1955 | Supinger | 210/148 |
| 2,768,751 | 10/1956 | Booth | 210/437 |
| 2,843,269 | 7/1958 | Dudinec | 210/437 |
| 2,961,007 | 11/1960 | Martin | 138/131 |
| 2,994,435 | 8/1961 | Moore | 210/484 |
| 3,152,618 | 10/1964 | Rothermel | 138/122 |
| 3,221,819 | 12/1965 | Dickinson | 210/457 |
| 3,231,092 | 1/1966 | Goldman | 210/457 |
| 3,323,553 | 6/1967 | Richitelli | 138/122 |
| 3,327,864 | 6/1967 | Ball et al. | 210/457 |
| 3,334,753 | 8/1967 | Royer et al. | 210/457 |
| 3,836,005 | 9/1974 | Bauer | 210/166 |

FOREIGN PATENT DOCUMENTS

| | | | |
|---|---|---|---|
| 0250720 | 1/1988 | Germany | 210/485 |
| 488532 | 12/1953 | Italy | |
| 127028 | 1/1950 | Sweden | 210/437 |
| 689661 | 12/1950 | United Kingdom | |
| 2203960 | 11/1988 | United Kingdom | 210/485 |
| 0414336 | 2/1991 | United Kingdom | 210/485 |
| WO89/01358 | 8/1988 | WIPO | |

Primary Examiner—David A. Scherbel
Assistant Examiner—Randall E. Chin
Attorney, Agent, or Firm—Baker & Daniels

[57] ABSTRACT

A filter support tube for use in a filter cartridge including a helical wound wire defining a cylinder and a plurality of reinforcing strips extending generally parallel to a longitudinal axis of the helical wire cylinder and circumferentially spaced from one another about a perimeter of the cylinder. The multiple turns of the helical wire are embedded in the reinforcing strips and extend through it. The wire is coated with a bonding agent to permit the wire to bond to the reinforcing strips and to provide corrosion resistance. The reinforcing strips embedding the wire lock the wire in the desired helical configuration and provide the required column strength for the filter support tube.

10 Claims, 11 Drawing Sheets

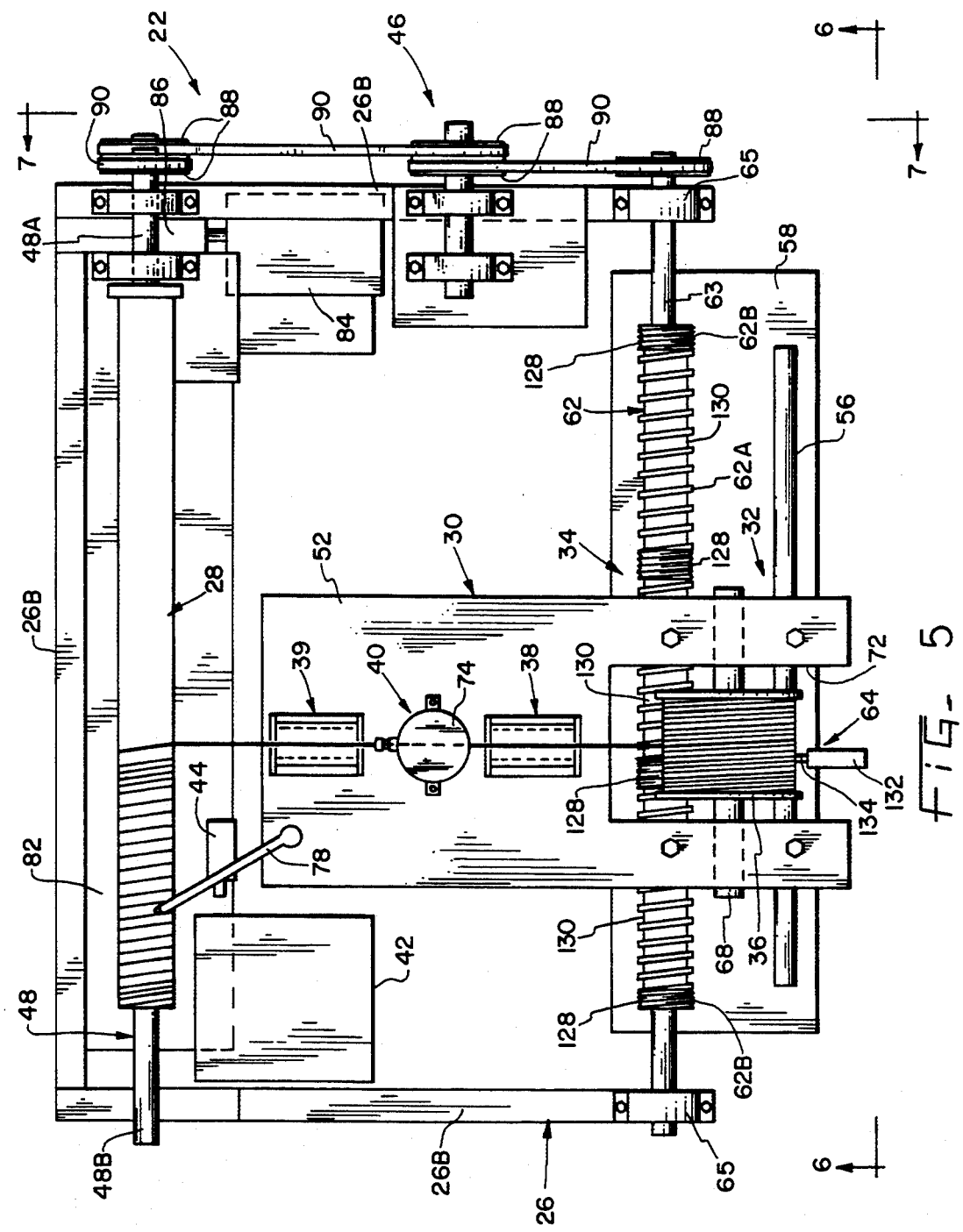

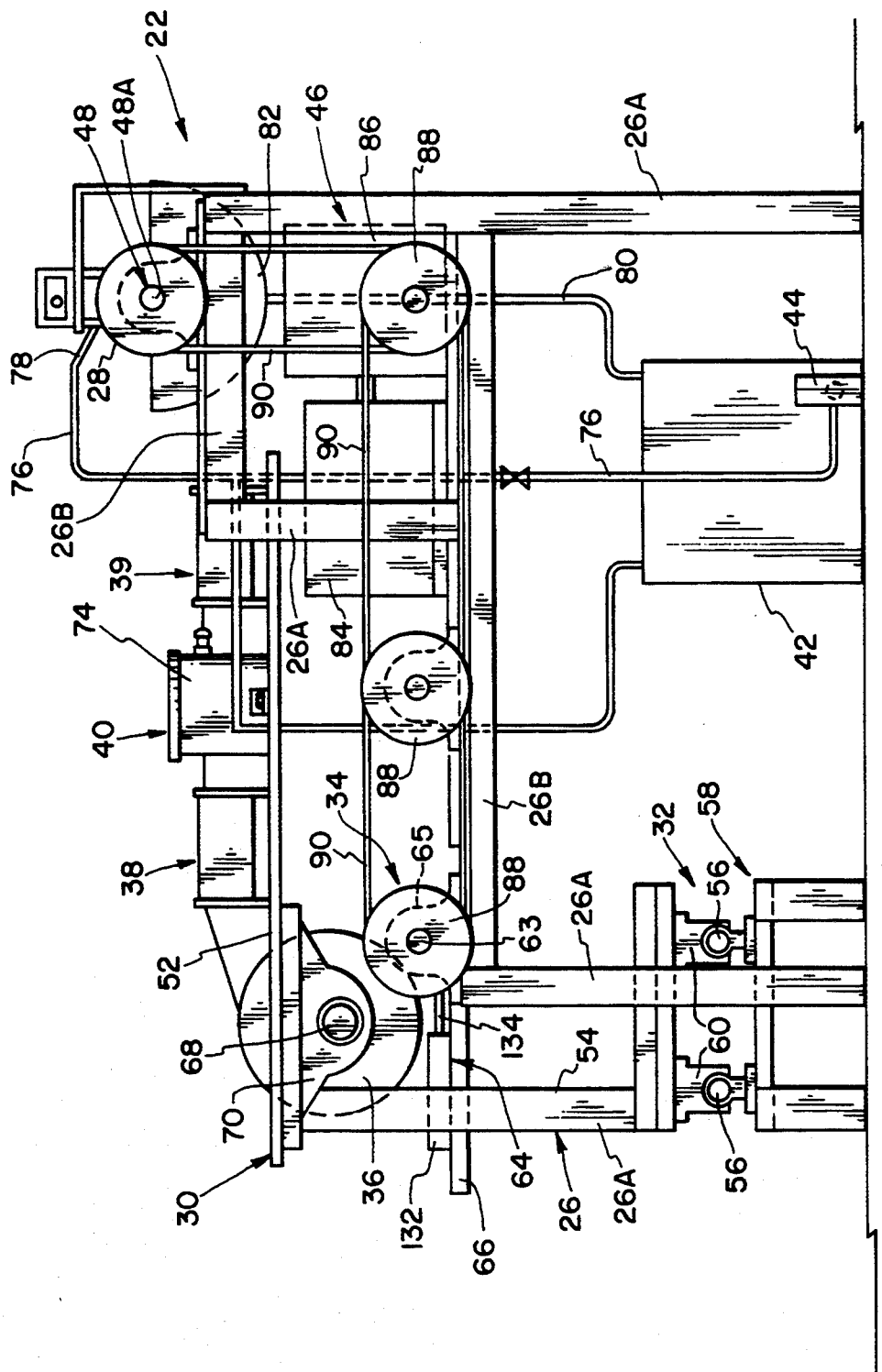

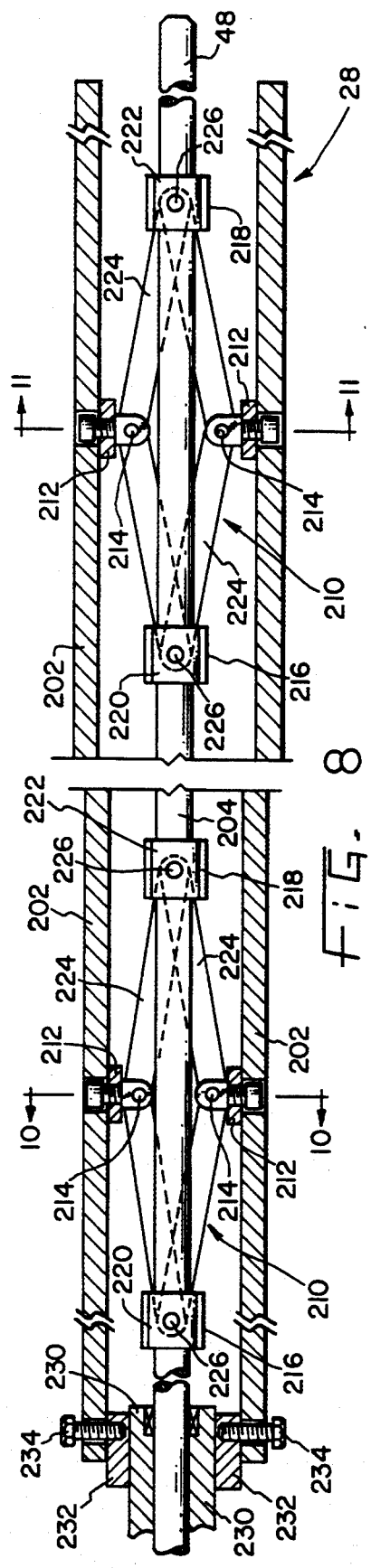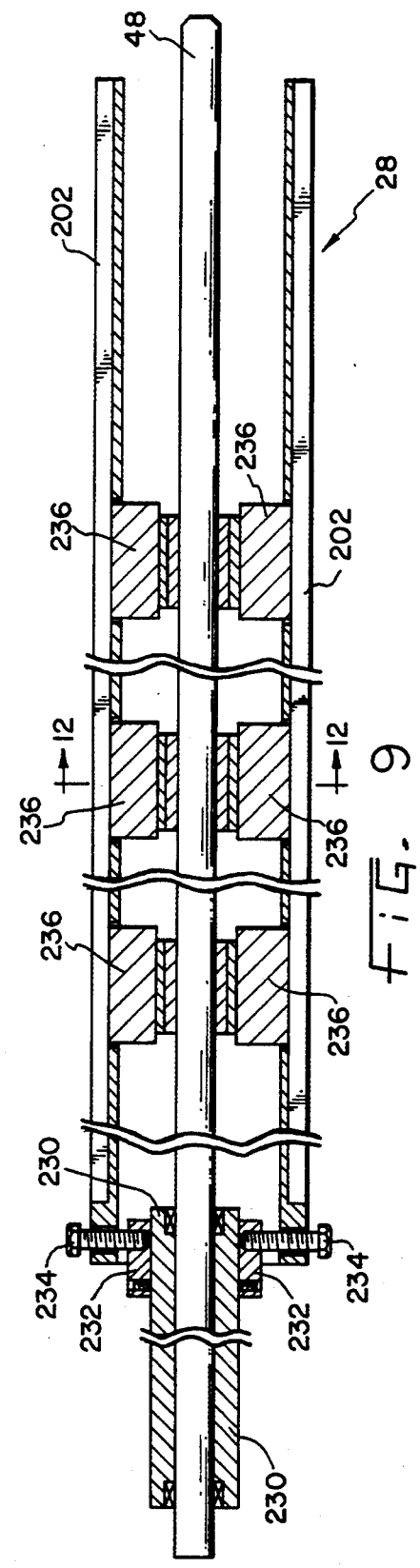

FILTER SUPPORT TUBE FOR A FILTER CARTRIDGE

BACKGROUND OF THE INVENTION

The present invention relates generally to the construction of replacement filter cartridges and, more particularly, to a filter support tube for use in a filter cartridge.

At the heart of all replacement filter cartridges is a means of structural mechanical support. For four decades or more, a perforated metal support tube has been widely used as a structural support member for all types of pleated paper or other types of filter cartridges and also for coalescers to provide mechanical strength against rupture from the "outside in" direction or from the "inside out" direction. Also, the perforated metal support tube provides a means of creating longitudinal support for a gasket seal.

There have been many improvements in the perforated metal support tube for filter cartridges over the years but the basic design of this structure has remained the same. Basically, it is a relatively thin-walled metal cylinder perforated with small holes over its total surface area. This design has several fundamental weaknesses which has rendered it far from the ideal as a structural strength member.

One fundamental weakness is that the "open area", in other words the perforations or holes, provided in the cylinder wall to allow adequate fluid flow affects the structural strength of the tube. To provide the barest minimum of structural strength of the tube it is necessary to limit perforations to only about 35% to 40% of the total surface area of the cylinder wall. This means that about 60% of the surface area of the cylinder wall is completely blocked to fluid flow. It is readily apparent that this restriction to fluid flow is extremely detrimental to filter performance in that the filter life is decreased, initial and final differentials are much higher, and a loss in filter efficiency is incurred. Further, this restricted flow area becomes particularly significant in the case of air or gas filtration where the pressure differential across the perforated metal cylinder is frequently greater than the pressure differential across the filter media itself.

Another fundamental weakness is that manufacturing of the perforated metal support tube for a filter element requires that a relatively thin perforated metal be used in order to permit easy formation of the cylindrical shape of the tube. However, such thin perforated metal has very low strength to resist crushing when pressure differentials build up on the filter media in the "outside in" direction especially. Improvements have been made by corrugating the metal to provide ridges which add to structural strength. Also, perforated metal cylinders are now available which include a helical lock seam which greatly strengthens the structural member but further complicates the "blinding" of the available surface area. Frequently, it is necessary to reinforce the perforated metal cylinders with a spiral helical wire which is spot welded to the perforated metal to provide additional structural strength. The helical lock seam also tends to collapse longitudinally when trying to effect a gasket seal.

Still another fundamental weakness is the use of small perforations or holes which adversely affects filter efficiency. The small holes (for instance $\frac{1}{8}$ to $\frac{1}{4}$ inch diameter) in the perforated metal cylinder causes localized high velocities in fluid flow which tends to drive small particles of one to two microns in size through the filter media by the force of momentum ($\frac{1}{2}$ mv$^2$). This is particularly significant in the case of coalescer elements where the coalescer performance specifications require Red Iron Oxide as the basic solids contaminant with greater than 94% of these particles being less than one micron in size.

Consequently, a need still exists for an alternative filter support tube design that will overcome the weaknesses described above as inherent with the prior art perforated metal design.

SUMMARY OF THE INVENTION

The present invention provides a filter support tube designed to satisfy the aforementioned needs. An apparatus and method for making the filter support tube comprises the invention of copending U.S. patent application entitled METHOD AND APPARATUS FOR MAKING A FILTER SUPPORT TUBE, Ser. No. 07/735,437, filed on same date herewith, now U.S. Pat. No. 5,207,856, and assigned to the assignee of the present invention. However, a description of the apparatus and method of the invention of the copending application is included in the present application for facilitating a complete understanding of the filter support tube of the present invention.

Generally, the present invention provides a filter support tube comprising a helical wound wire defining a cylinder and a plurality of reinforcing strips extending generally parallel to longitudinal axis of the helical wire cylinder and circumferentially spaced from one another about the perimeter of the cylinder.

More specifically, the invention provides a filter support in which the helical wire of the cylinder is embedded in the reinforcing strips and extends therethrough. The wire is coated with a bonding agent to permit the wire to bond to the reinforcing strips. The coating also provides corrosion resistance. The reinforcing strips embedding the wire lock the wire in the desired helical configuration and provide the required column strength for producing the end force needed to effect gasket seals at the end of the filter elements.

An advantage of the filter support tube of the present invention is that it provides greater open area for fluid flow, a lower pressure differential, and a longer filter life than the perforated metal cylinder design.

Another advantage of the filter support tube of the present invention is that the pitch of the wire turns and the diameter of the wire can be selected to withstand substantially increased differential pressures, thereby increasing structural strength of the filter support tube.

Still another advantage of the filter support tube of the present invention is that localized velocities are eliminated by eliminating use of small perforated holes as in the prior art perforated metal design, thereby improving filter efficiency.

The present invention, in one form thereof, comprises a filter support tube for a filter cartridge in which a wire is wound in a coiled configuration and defined by a plurality of turns. A plurality of reinforcing strips extend across the plurality of turns of the wire. These strips are generally parallel to and spaced from one another. The turns of the wire extend transversely through the reinforcing strips and are imbedded in the reinforcing strips. The strips lock the turns of the wire in the coiled position.

The present invention, in one form thereof, further comprises a filter support tube for a filter cartridge wherein a wire is wound in a helical configuration and defines a cylinder having a central longitudinal axis and a perimeter. A plurality of reinforcing strips extend generally parallel to the longitudinal axis of the cylinder of the helical wound wire. These reinforcing strips are circumferentially spaced from one another about the perimeter of the cylinder. The helical wire of the cylinder is embedded in and extends transversely through the reinforcing strips so that the strips lock the wire in the helically wound configuration.

BRIEF DESCRIPTION OF THE DRAWINGS

FIG. 5 is a top plan view of an apparatus for making the filter support tube in accordance with the invention of the copending application;

FIG. 7 is a side elevational view of the apparatus as seen along line 7—7 of FIG. 5;

FIG. 8 is an enlarged fragmentary axial sectional view of a winding mandrel of the apparatus of FIG. 5;

FIG. 9 is a view of the mandrel of FIG. 8 that has been rotated 90 degrees;

DETAILED DESCRIPTION OF THE INVENTION

Figure 1:
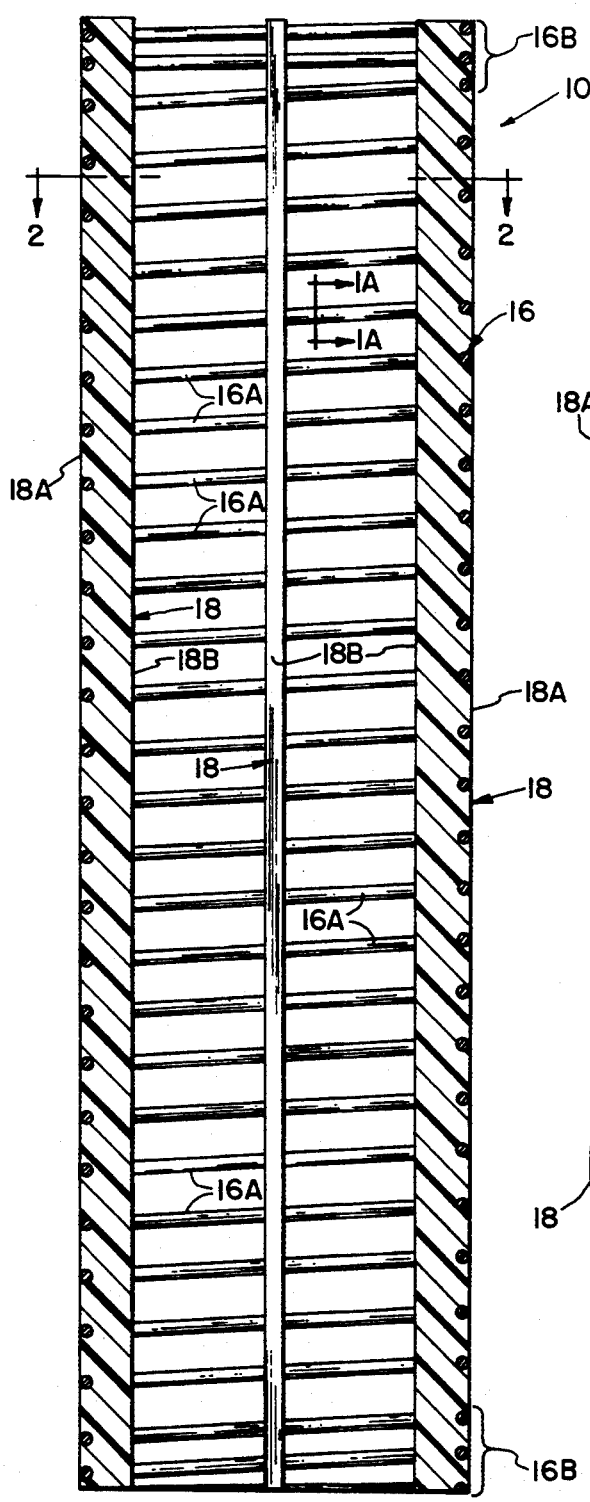
FIG. 1 is an axial sectional view of a filter support tube for a filter cartridge in accordance with the present invention.
Figure 1A:
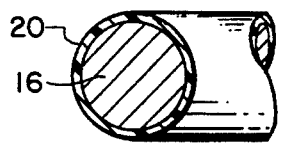
FIG. 1A is an enlarged fragmentary cross-sectional view of a helical wound wire of the filter support tube taken along line 1A—1A of FIG. 1.
Figure 2:
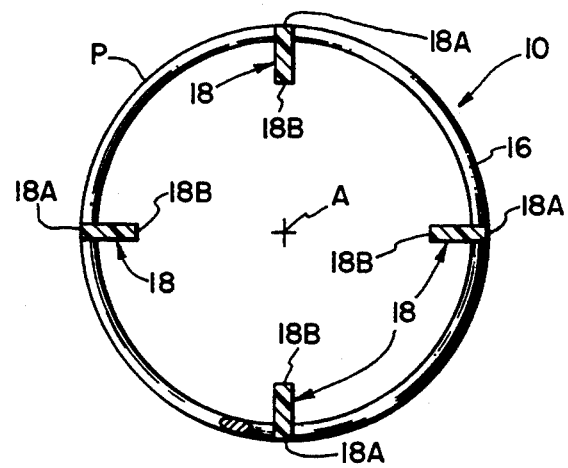
FIG. 2 is a cross-sectional view of the filter support tube taken along line 2—2 of FIG. 1.
Figure 4:
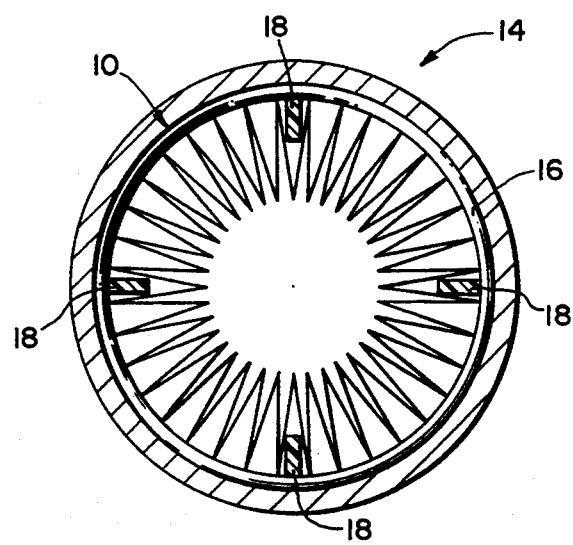
FIG. 4 is a cross-sectional view of a coalescer having the filter support tube of FIG. 2 as its external support.
Figure 3:
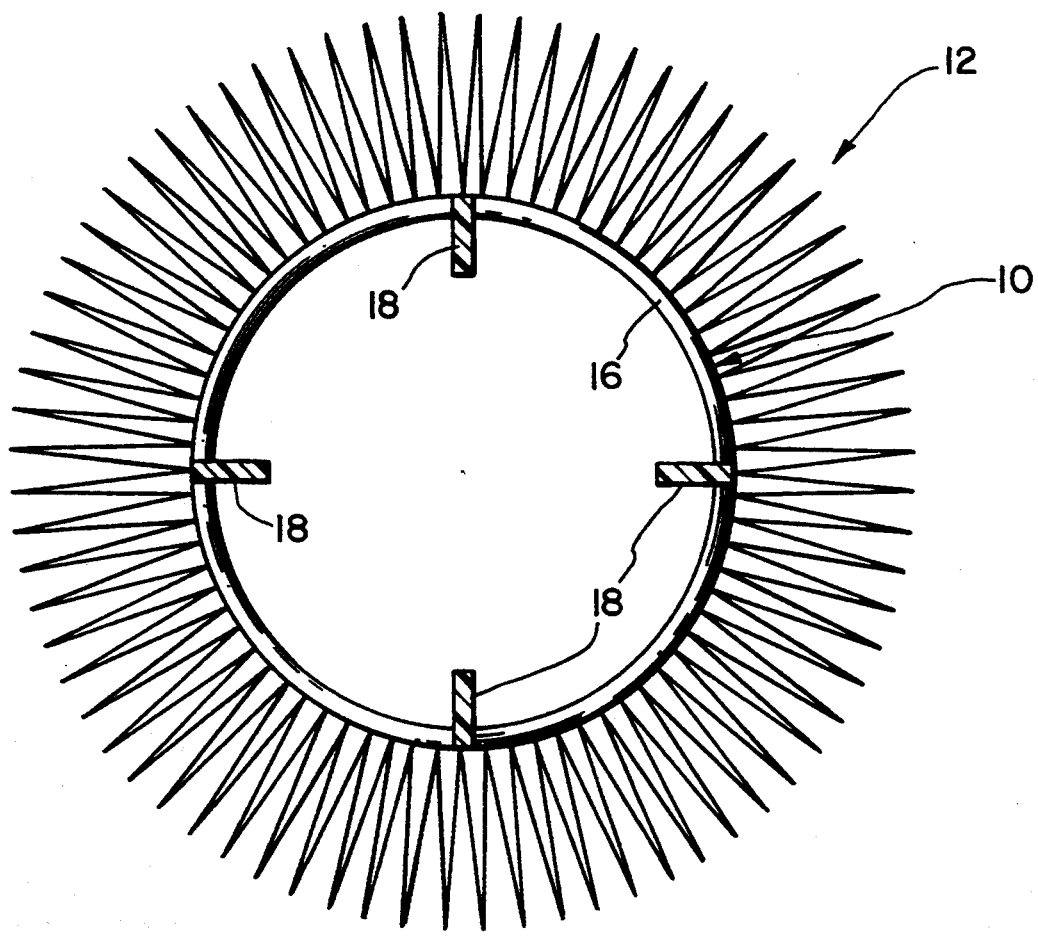
FIG. 3 is a cross-sectional view of a pleated filter having the filter support tube of FIG. 2 as its internal support.

Referring now to the drawings, and particularly to FIGS. 1 and 2, there is illustrated a filter support tube of the present invention, being generally designated 10, for use in a filter cartridge, such as a pleated filter 12 seen in FIG. 3 or a coalescer 14 seen in FIG. 4. In its basic components, the filter support tube includes a wire 16 wound in a coiled configuration defined by multiple 360° turns 16A, and a plurality of generally straight reinforcing strips 18 which extend transversely across the turns 16A of wire 16 and are disposed generally parallel to and spaced from one another.

More particularly, wire 16 is wound in a helical configuration so as to define a cylinder in profile having a central longitudinal axis A and an outer perimeter P. The reinforcing strips 18 are disposed at the perimeter P of the cylinder defined by helical wound wire 16. The strips 18 extend generally parallel to the longitudinal axis A of the helical wound wire cylinder and are circumferentially spaced from one another about the perimeter P of the cylinder. The strips 18 may be composed of a plastic, such as a material sold by General Electric Corp. under the trademark Noryl which is a high strength thermoplastic having a high heat resistance, melting at approximately 200° F.

The turns 16A of helical wire 16 are embedded in and extend transversely through plastic reinforcing strips 18 such that strips 18 set and lock wire 16 in the desired helical wound configuration. Strips 18 also serve to provide column strength to effectively produce the resistant force needed to effect gasket seals (not shown) at the ends of the filter cartridge. With wire 16 locked in the helical position by melting and embedding into plastic strips 18, the finished center tube has the strength to withstand pressure differentials greater than 80 psi when used with pleated paper filter cartridges, as shown in FIG. 3, wherein fluid flows in the "outside in" direction. Using just the four plastic strips 18 as shown in FIGS. 1 and 2, tests have revealed that this type of support tube 10 will withstand a column load of greater than 300 inch pounds of torque which is at least twice as much as is required for normal gasket sealing at the ends of the filter cartridge.

The wire 16 is wound when heated to a temperature of approximately 500° F. At such elevated temperature, wire 16 melts through reinforcing strips 18 so as to embed itself as it is being wound into the helical or coiled configuration. Before being wound into the helix, wire 16 is continuously externally coated with a coating 20, such as a powdered epoxy or polycarbonate plastic, which acts as a bonding agent to permit bonding of heated wire 16 to reinforcing strips 18 while at the same time the hot wire is embedding itself within the plastic strips 18. However, coating 20 on wire 16 primarily is for corrosion resistance and secondarily is for serving as a bonding agent. It will be observed that embedded wire 16 is located adjacent outer longitudinal edge 18A of strips 18 and remote from inner longitudinal edge 18B thereof such that the outer edge of the strip is aligned with the outside diameter of the wire which is the perimeter P of the cylinder, as can be seen in FIG. 2. The remainder of the width of strip 18 extends within the outside diameter of wire 16 and perimeter P of the cylinder defined by the helical wire.

Testing of the prior art perforated metal tube design has shown that the weakest point is at the opposite ends of the prior art filter support tube. Helical wound wire 16 overcomes this weakness by being wound with a shorter pitch at its opposite end portions than the regular pitch along the main length of tube 10. In other words, as can easily be observed in FIG. 1, turns 16A of wire 16 at opposite end portions 16B are axially spaced closer to one another than the rest of the turns making up the middle portion of the wire which extend between and connect with the opposite end portions 16B.

By way of an example, wire wound support tube 10 shown in FIGS. 1 and 2 is 14 inches in length and 3⅜ inches in outside diameter. Other lengths and diameters are possible. For instance, outside diameters may range anywhere from 2 to 14 inches. Also, the diameter of wire 16 shown is 0.120 inch. However, the wire diameter can be changed to a larger diameter where greater strength is required or a smaller diameter where less strength is required as would be the case in the "inside out" coalescer design. In instances of extreme compatibility problems such as highly concentrated sulfuric acid or other applications, stainless steel wire is readily available to be used with the helical wire wound design of the present invention.

FIG. 3 illustrates use of helical wound wire filter support tube 10 as a center tube for pleated filter 12 which, as an example, has a 6 inch outside diameter. The open area of this filter element is 74% or approximately 100% greater than that of an equivalent length of the prior art perforated metal.

FIG. 4 illustrates helical wound wire filter support tube 10 used as an outer structural strength support for a coalescer cartridge 14, for instance, of 4 inch diameter. Present coalescer performance specifications require that these cartridges withstand a differential pressure of 75 psi in the inside-to-out flow direction. Tests are conducted with dry Red Iron Oxide contaminant and all of the present manufacturers of this type of cartridge utilize an inner pleated core as a prefilter. This inner core can be supported with a wire wound helical tube, and thus the coalescer cartridge can withstand as much as 100 psi in the "inside out" direction.

The design of the present invention has much greater structural strength than that obtainable with perforated metal in that the perforate metal must either be lock seamed or spot welded in the circumferential wrap. In this instance, the wire 16 is a continuous helix and there is no joint which is vulnerable to rupture.

The embedded helical wire/reinforcing strip design of the filter support tube 10 of the present invention offers several advantages over the perforated metal design which can be summarized as follows. It roughly doubles the available open area as compared to the perforated metal, and provides a lower pressure differential and a longer filter life. Also, the spacing between turns of the wire and the diameter of the wire can be selected so as to withstand substantially increased differential pressures, thereby increasing structural strength of the filter support tube. Localized velocities are eliminated by elimination of the small perforated holes of the metal design, thereby improving filter efficiency. The wire is coated with a protective corrosion resistant agent and the plastic strips are corrosion resistant as well.

Figure 6:
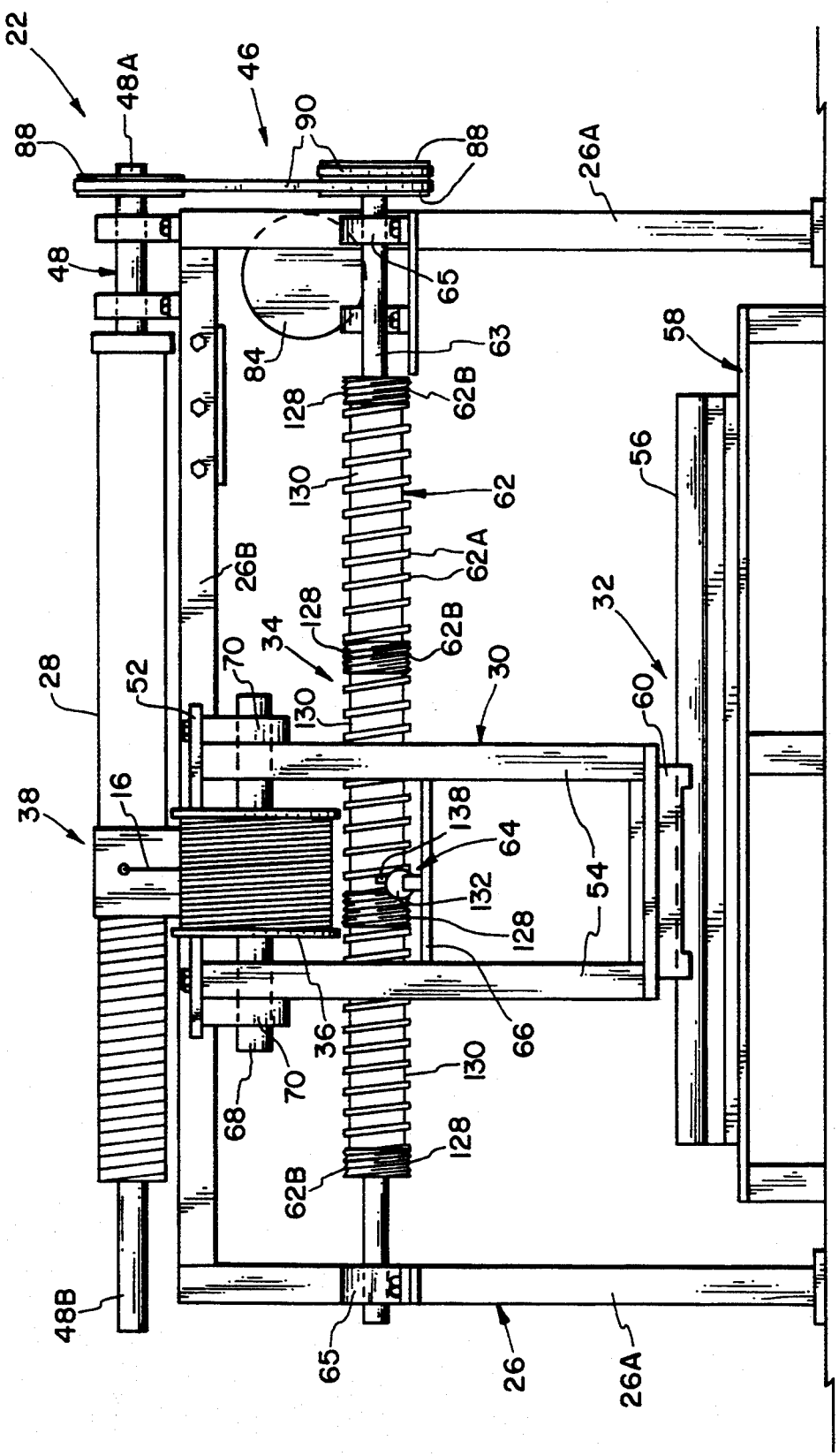
FIG. 6 is a front elevational view of the apparatus as seen along line 6—6 of FIG. 5.

Turning now to FIGS. 5–7, there is illustrated an apparatus of the invention of the copending application, generally designated 22, for automatically producing filter support tubes 10 of the present invention. FIGS. 8–16 illustrate details of various components of apparatus 22 as will be described below. FIG. 17 depicts a flow diagram which illustrates the steps of the method of the invention of the copending application for making filter support tubes 10 using apparatus 22 of FIGS. 5–7.

Referring to FIGS. 5–7, in its basic components, apparatus 22 includes a stationary main frame 26 and an elongated mandrel 28 mounted on the main frame 26.

Also, apparatus 22 includes an auxiliary frame 30, a linear motion guide assembly 32 mounting auxiliary frame 30 for movement relative to main frame 26, an auxiliary frame drive mechanism 34 for powering movement of auxiliary frame 30, and a wire storing reel 36, two wire heating mechanisms 38 and 39 and a wire coating mechanism 40 all mounted on auxiliary frame 30 for movement therewith relative to main frame 26 and mandrel 28. Further, apparatus 26 includes a cooling water reservoir 42 and water pump 44, and a drive power source 46.

More particularly, stationary main frame 26 includes rigidly interconnected upright and horizontal support members 26A, 26B. Mandrel 28 has a central shaft 48 which at one end 48A is supported in cantilevered fashion by bearing shaft 230 on one of horizontal support members 26A of main frame 26 for rotation about an axis defined by central shaft 48. The opposite end 48B of central mandrel shaft 48 is thus left free or unsupported and thereby permits the finished filter support tube 10 to be removed from mandrel 28 over its unsupported end 48B. Rotation of mandrel 28 produces filter support tube 10 composed of helical wound wire 16 and plurality of elongated strips 18 which interconnect and reinforce wire 16. Also, mandrel 28 is actuatable between a first expanded condition in which it is set to permit forming of filter support tube 10 thereon and a second contracted condition in which it is set to permit release and removal of the formed filter support tube 10 therefrom. The construction of mandrel 28 will be described in detail later.

The auxiliary frame 30 of apparatus 22 is composed of a table top 52 and table top support 54 which extends below and supports table top 52 in cantilevered fashion at one end portion thereof. The linear motion guide assembly 32 positions auxiliary frame 30 adjacent mandrel 28 for movement relative to mandrel 28 along a linear path extending generally parallel to the mandrel. The guide assembly 32 includes a pair of guide rails 56 fixedly supported on a base frame 58 which is separate from main frame 26 and a pair of guide bearings 60 attached to the underside of table top support 54. The guide assembly 32 may be one manufactured by Thomson Corp. in which a force of five pounds can move a weight of 1000 pounds in either direction linearly along guide rails 56.

Auxiliary frame drive mechanism 34 includes an elongate lead screw 62 and a lead screw follower 64. Lead screw 62 extends between spaced horizontal members 26B of main frame 26 and is rotatably mounted by bearings 65 on spaced horizontal members 26B. Lead screw 62 also passes across main frame 26 below table top 52 and in front of table support 54 of auxiliary frame 30. Lead screw follower 64 is mounted on a plate 66 attached to table support 54, as seen in FIG. 6. Details of the construction of lead screw 62 and follower 64 will be described later. As seen in FIGS. 5 and 6, auxiliary frame 30 is located in between its leftmost starting position and rightmost ending position. The speed of rotation of lead screw 62 and the pitch of its threads 62A determines the speed of the linear movement of auxiliary frame 30 and the pitch of the turns 16A of wire 16 about mandrel 28. Lead screw 62 can effectively move auxiliary table 30 from left to right and back along linear guide rails 56, providing the correct linear speed to reproduce exactly the pitch of lead screw threads 62A on the pitch of the wire as it is wound on mandrel 28.

Auxiliary frame 30 mounts wire storing reel 36, wire heating mechanisms 38 and 39, and wire coating mechanism 40 for movement with auxiliary frame 30. Reel 36 has a shaft 68 rotatably mounted by bearings 70 to the underside of table top 52 such that reel 36 is disposed within a cutout 72 in the table top. Reel 36 stores wire 16 as a continuous strand having its leading terminal end connected to mandrel 28. Rotation of mandrel 28 thus draws wire 16 from wire storing reel 36 to mandrel 28 and winds wire 16 about the mandrel.

Wire heating mechanisms 38 and 39 are mounted on table top 52 of auxiliary frame 30 between wire storing reel 36 and mandrel 28. Heating mechanisms 38 and 39 are preferably gas burners using a forced air/gas mixture in a continuous flame beneath the wire which heats the wire to a very high temperature in one second of exposure. One such burner is a LINOFLAME (TM) gas burner manufactured by Maxon Corporation. As shown in FIG. 5, heater 38 is placed in front of coating mechanism 40, and heater 39 is placed behind coating mechanism 40 so that a more even corrosion resistant coating is achieved.

Figure 13:
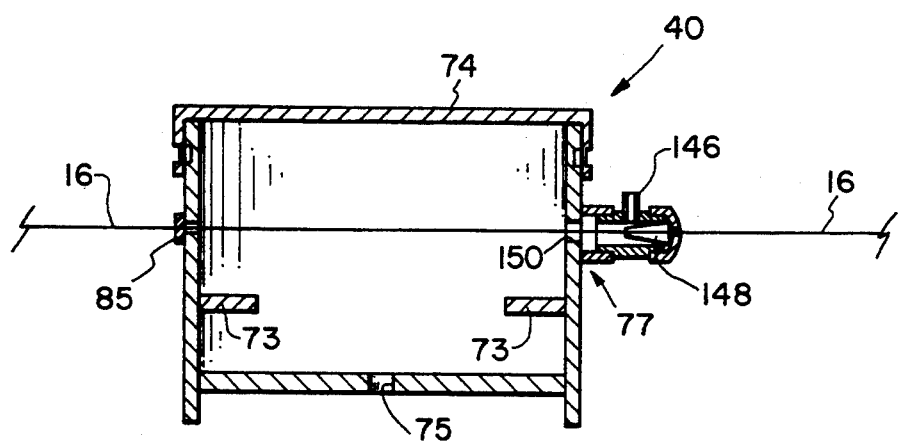
FIG. 13 is an enlarged cross-sectional view of the coating mechanism of FIG. 5.
Figure 14:
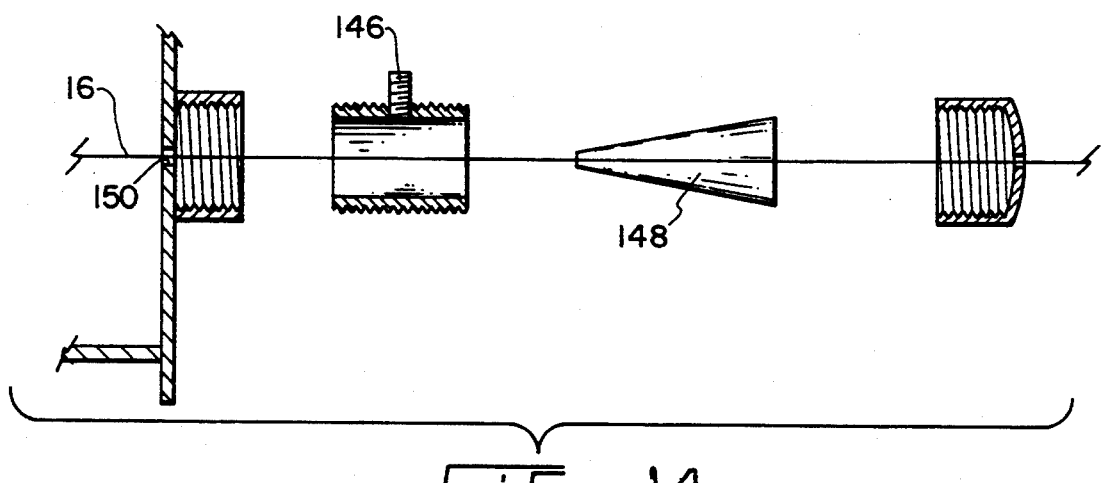
FIG. 14 is an exploded view of the outlet portion of the coating mechanism of FIG. 13.

Wire coating mechanism 40 is mounted on table top 52 of auxiliary frame 30 between wire heating mechanism 38 and mandrel 28 for applying a continuous corrosion resistant coating to the wire as the wire is drawn from heating mechanism 38 to heating mechanism 39. Referring to FIG. 13, coating mechanism 40 is a fluidized bed of epoxy powder provided in a container or box 74. Air at 3 to 5 psi is injected at the bottom of box 74 through opening 75 to provide the proper air flotation of powder to coat hot wire 16. The air is released from box 74 through an aperture in the top plate. The aperture is covered by filter paper to prevent the escape of powder from box 74. The epoxy powder is contained above a piece of 1 micron filter paper (not shown) which is sealed and supported by a perforated seal plate 73. Wire 16 enters container 74 at one side through a rubber grommet seal 85 to prevent powder from escaping the container at the inlet end. The coated wire exits the container at outlet end 77 on the opposite side of container 74. Since a grommet seal at the outlet end 77 of container 74 would remove the coating on wire 16, a "counter" air pressure system is provided to prevent the powder from escaping through outlet opening 150 by directing air flow in the opposite direction. As shown in FIGS. 13 and 14, a parallel secondary air stream is directed to pipe nipple 146 on outlet end 77 of container 74. A sealed cone 148 directs this secondary stream of air through outlet opening 150 to oppose the primary air flow which carries the epoxy powder.

Figure 13A:
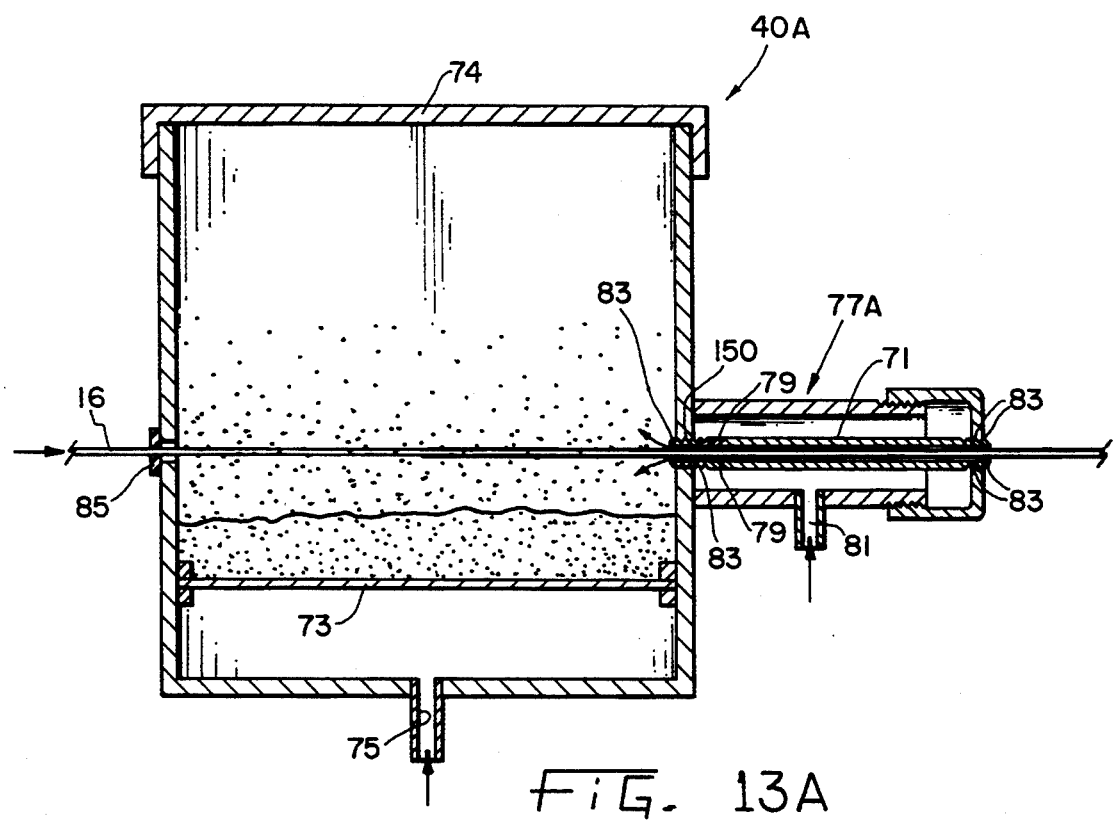
FIG. 13A is an enlarged cross-sectional view of an alternative embodiment of the coating mechanism of FIG. 13.
Figure 14A:
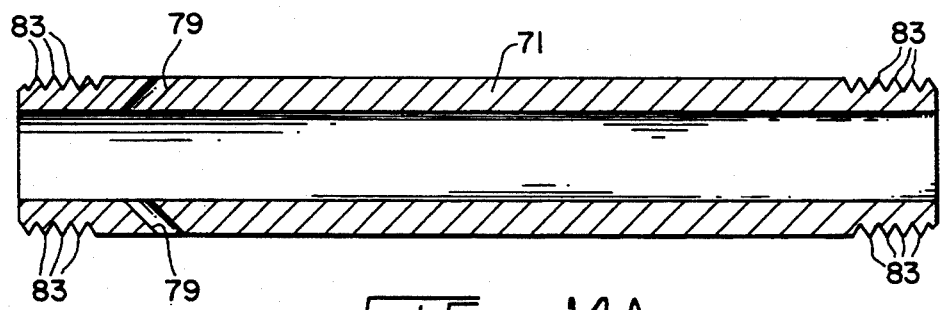
FIG. 14A is an enlarged fragmentary view of the outlet portion of the coating mechanism of FIG. 13A.

In an alternative embodiment to coating mechanism 40, there is shown in FIG. 13A a coating mechanism 40A. In this embodiment, the "counter" air pressure system is achieved by a small pipe nipple 71 threaded into the body of box 74. Pipe 71 includes threads 83 located at the axial ends of pipe 71 to threadedly secure the pipe within outlet end 77A of box 74. Pipe 71 extends the axial length of outlet end 77A as shown in FIG. 13A. Referring to FIG. 14A, pipe 71 includes four small air openings 79 spaced about 90° apart around the periphery of pipe 71. Preferably, air openings 79 are angled at about 45° with respect to the horizontal axis of pipe 71 to direct the stream of air toward outlet opening 150. Air at about 30 psi is directed through opening 81. This relatively high pressure air then flows through air holes 79 which directs the air toward outlet opening 150 to oppose the primary air flow which carries the epoxy powder. Since the air entering through opening 81 is at 30 psi and the air entering through opening 75 is at approximately 5 psi, the epoxy powder will remain within box 74 and not escape through outlet opening 150.

Referring again to FIG. 7, cooling water reservoir 42 and water pump 44 located near reservoir 42 are connected by cooling water feed conduits 76 to mandrel 28 via a nozzle 78. Water pump 44 may be a 1 gpm positive displacement pump. Secondarily, the cooling water from reservoir 42 is circulated through water nozzle 78 which sprays water over the hot wire after it is embedded in plastic strips 18 on mandrel 28. Water collector trough 82 collects the water and directs it back to reservoir 42 via return conduit 80. The purpose of water injection over wire 16 is to harden the wire and to provide greater strength and also to permit handling the hot support tube after the winding operation is complete.

Drive power source 46 of apparatus 22 includes a drive motor 84 mounted on main frame 26 which is drivingly coupled to reduction gearbox 86. For example, the output of gearbox 86 is 60 rpm. The rotating motion is imparted to mandrel shaft 48 and lead screw 62 by means of an arrangement of pulleys 88 and endless belts 90. Pulleys 88 are of the same diameter, for example six inches, and thus all rotate at the same speed. Pulleys 88 may be timing cog pulleys such that belts 90 are locked into slots in the periphery of the pulley. Motor 84 may be a ¾ horsepower, 1750 rpm, 230 volt, 3-phase motor.

In the illustrated design, sixty seconds are required to move auxiliary frame 30 from its leftmost starting position to its rightmost ending position so as to wind wire 16 along the entire forty-four inch length of mandrel 28. This means that wire 16 is moving at a linear speed of approximately one foot per second.

Figure 10:
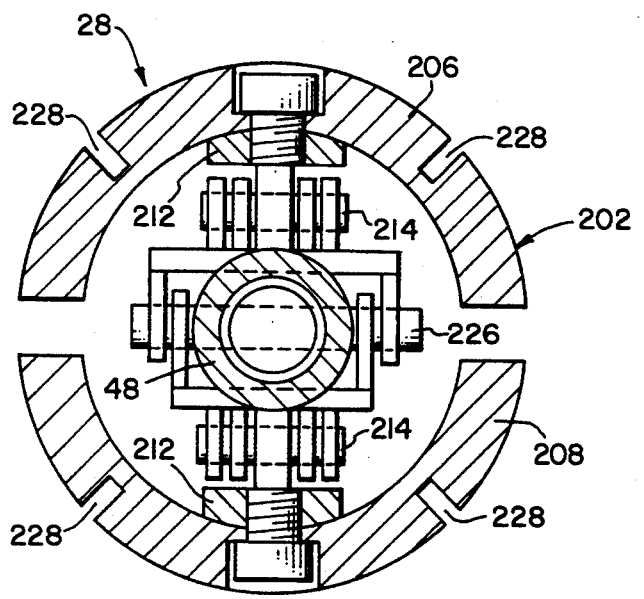
FIG. 10 is a cross-sectional view of the winding mandrel taken along line 10—10 of FIG. 8.
Figure 11:
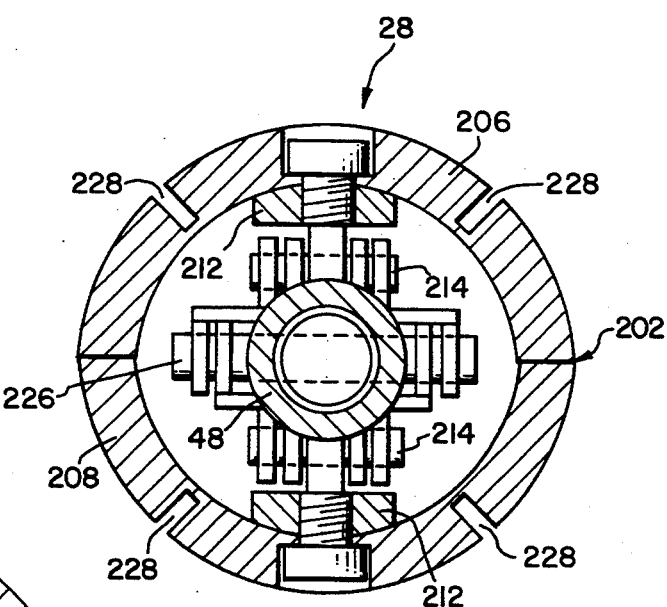
FIG. 11 is a cross-sectional view of the winding mandrel taken along line 11—11 of FIG. 8.
Figure 12:
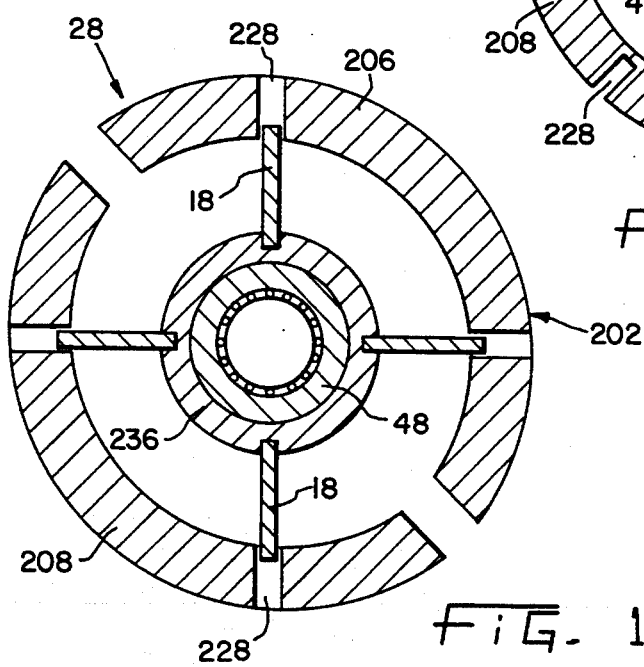
FIG. 12 is a cross-sectional view of the winding mandrel taken along line 12—12 of FIG. 9.

Referring to FIGS. 8-12, there are illustrated the details of mandrel 28. Referring to FIGS. 8 and 9, mandrel 28 includes an expandable and retractable cylinder 202 axially surrounding a central shaft 48. Shaft 48 is assembled in five sections, which are then threadedly attached to one another once all the components are attached thereto. As shown in FIGS. 10 and 11, cylinder 202 includes an upper half 206 and a lower half 208. A pair of scissors assemblies 210 are each attached to cylinder 202 and are preferably spaced equidistant from one another such that mandrel 28 is divided into two equal sections. Each scissors assembly 210 is attached to mandrel 28 at a mandrel pivot block 212 via pivot pins 214. Scissors assembly 210 is connected to shaft 48 by a left hand threaded nipple 216 and a right hand threaded nipple 218. Left hand nipple 216 is rotatably threaded on a left hand thread 220, and right hand nipple 218 is rotatably threaded on right hand thread 222. Each scissors assembly 210 is linked together by links 224 which are pivoted at pivot pins 214 and 226 and prevent lateral movement of scissors assembly 210. When a counter-clockwise torque is exerted on shaft 48, threaded couplings 216 and 218 are moved toward each other since one is a left hand thread and the other is a right hand thread, thereby expanding mandrel 28 as shown in FIG. 8. When a clockwise torque is exerted on the scissors shaft 48, threaded couplings 216 and 218 move away from each other, and the mandrel contracts.

As best shown in FIGS. 10 and 11, mandrel 28 contains four slots 228 for mounting plastic strips 18 therein while the mandrel is divided into halves 206 and 208.

Preferably, the mandrel is driven by a one horsepower motor through a gear reduction box (not shown) that is connected to the outside end of bearing shaft 230 by means of a synchro-cog timing belt. Torque is transmitted through torque block 232 to mandrel 28 by means of cap screws 234. The length of cap screws 234 fixes the outside diameter of mandrel 28 while it is expanded.

As mandrel 28 rotates scissors shaft 48, all components rotate therewith since linkages 224 are connected to mandrel pivot block 212. When the mandrel motor is shut off, mandrel 28 is stationary and requires thousands of foot pounds of torque to rotate the gear box. However, scissors shaft 48 can be easily rotated, thereby rotating threaded nipples 216 and 218 which causes the threaded couplings to move in or out as previously described.

Referring now to FIG. 9, an extractor fin assembly is shown and prevents plastic strips 18 and center tube 16 from moving inwardly as mandrel 28 collapses. Fins 236 are flush with the bottom of the deep mandrel groove to prevent any distortion of plastic strips 18 or the finished diameter of center tube 16. The finished center tube 16 can then be withdrawn easily from mandrel 28.

An open end bearing assembly (not shown) supports the open end of scissors shaft 48 and supports the open end of mandrel 28. This bearing assembly is hinged so that it moves out of the path of center tube 16 as the finished center tube is withdrawn from the mandrel.

Figure 15:
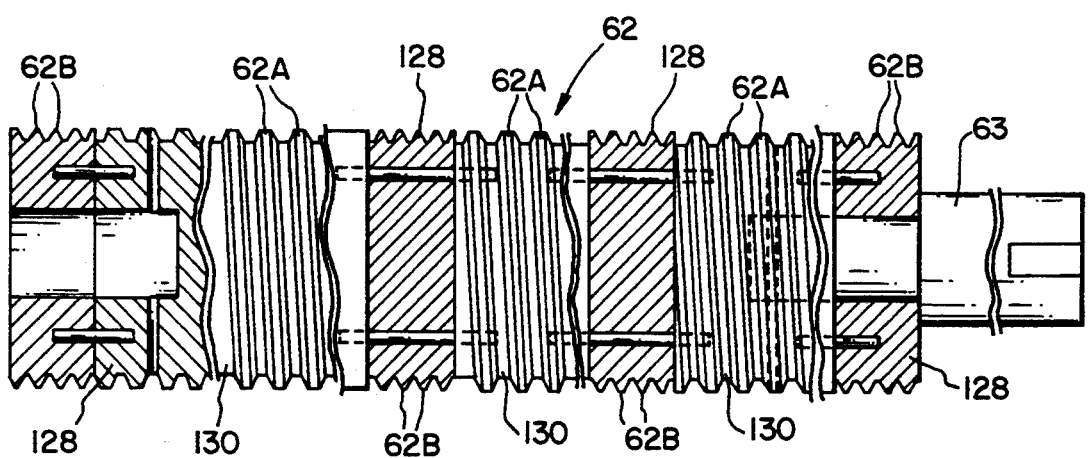
FIG. 15 is a top plan sectional view of a lead screw of the drive mechanism of the apparatus of FIG. 5.
Figure 16:
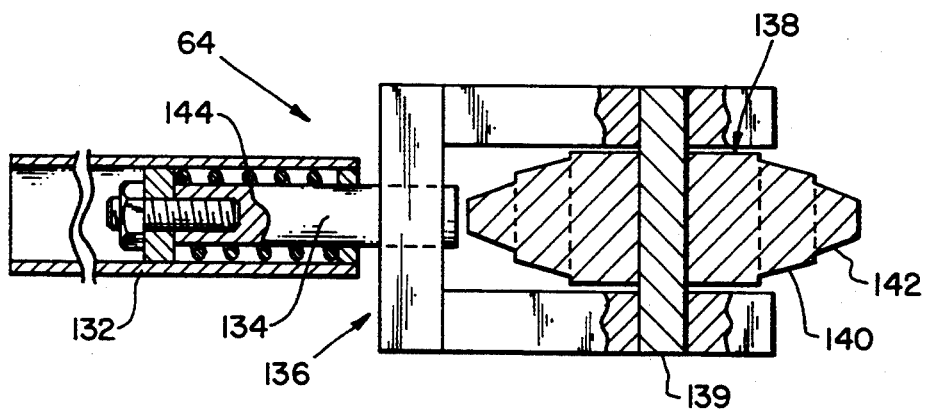
FIG. 16 is an enlarged view of the lead screw follower of the apparatus of FIG. 6.
Figure 17:
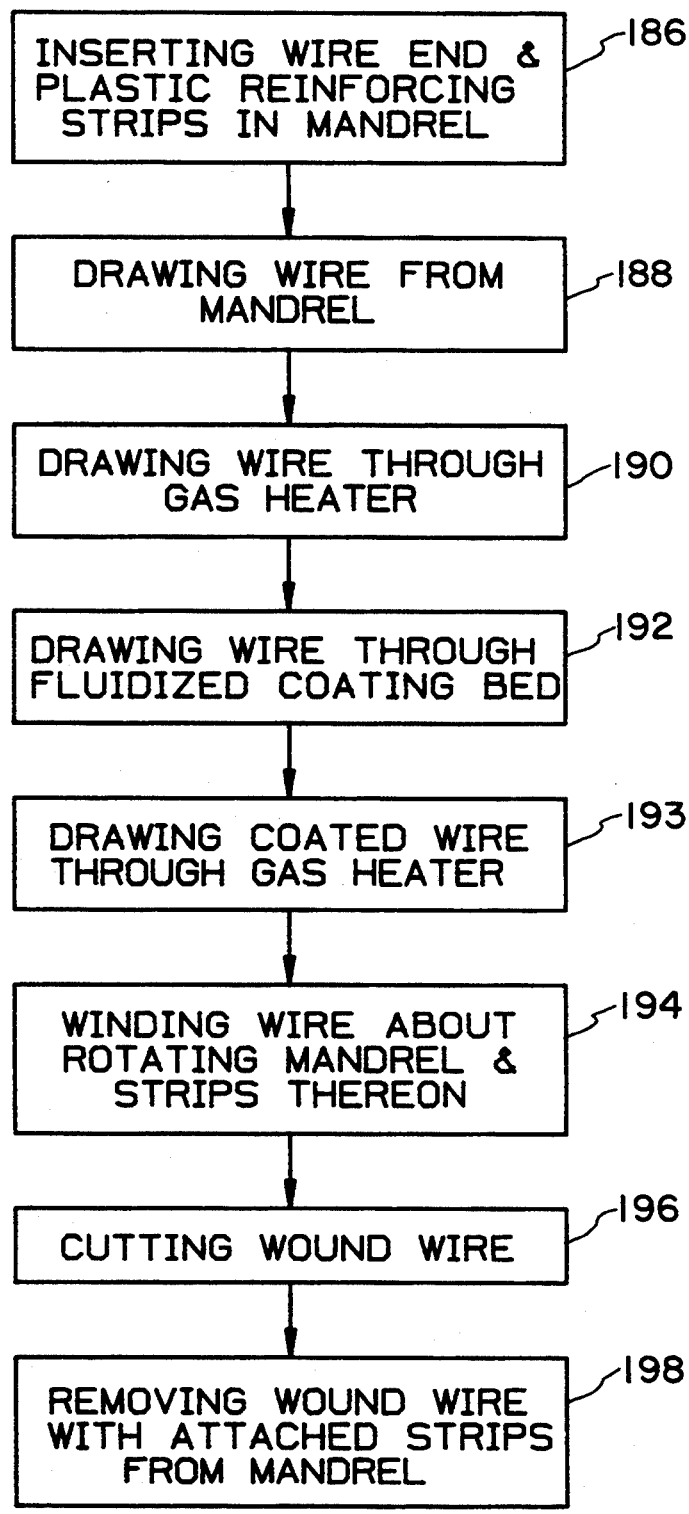
FIG. 17 is a flow diagram of a method for making the filter support tube in accordance with the invention of the copending application.

Referring to FIGS. 15 and 16, auxiliary frame drive mechanism 34 includes lead screw 62 and lead screw follower 64 which cooperate to determine and establish the desired pitch of turns 16A of wire 16 formed on mandrel 28. As seen in FIG. 15, lead screw 62 has continuous Acme thread 62A extending helically about the periphery thereof. The pitch of thread 62A is narrower at the opposite ends of the lead screw than along most of its length. For example, at opposite ends 62B of helical thread 62A, the pitch is ¼ inch, with the remainder of thread 62A being ½ inch. This is so the desired helical configuration of wire 16 will be formed on mandrel 28 having wire turns 16A with narrower pitches at the opposite end portions 16B of wire 16. To provide the different thread pitches for producing different pitch in support tube 10, lead screw 62 is constructed of three sections, two short outer sections 128 having the ¼ inch thread pitch and one long middle section 130 having the ½ inch thread pitch. Sections 128 and 130 are pinned together to form one continuous lead screw 62.

It can be observed in FIGS. 5 and 6 that apparatus 22 employs three lead screws 62 having the above construction being connected together end to end. Therefore, three filter support tubes 10 are formed each time auxiliary frame 30 moves through one pass from the left to right end of mandrel 28. Also, helical wire turns 16A can be spaced either closer together or further apart by simply changing the size of one pulley 88 on lead screw 62. Using a larger diameter (such as an 8 inch pulley) on lead screw drive shaft 63 will result in closer spacing of wire 16 whereas a smaller diameter (such as a 4 inch pulley) will space wire 16 further apart on mandrel 28. This will allow for greater strength where it is required or less strength and greater economics as the situation may direct.

As seen in FIGS. 5–7 and 16, lead screw follower 64 provides the link which couples auxiliary frame 30 to lead screw 62 such that rotation of lead screw 62 produces linear translatory movement of auxiliary frame 30. Since a common drive source 46 is concurrently rotating the mandrel and moving auxiliary frame 30, wire 16 is thus drawn out from reel 26 and wound about mandrel 28 as auxiliary frame 30 moves along the linear path, as defined by guide rails 56, along and relative to mandrel 28.

More particularly, lead screw follower 64 includes an actuating device in the form of an air cylinder 132 having a piston rod 134 extending from an end thereof, a bifurcated yoke 136 mounted to the end of rod 134, and a follower wheel 138 rotatably mounted by a bearing and shaft 139 to yoke 136. Follower wheel 138 has inner and outer concentric, cross-sectionally tapered, annular sections 140 and 142 which fit the respective pitches of thread 62A on lead screw 62. Also, a coiled return spring 144 is provided within the end of air cylinder 132 so as to bias piston rod 134 to retract within air cylinder 132 upon relief of the pressure in the cylinder, such as occurs during when auxiliary frame 30 is being returned back to the left starting position in FIG. 1. The air pressure is applied to cylinder 132 to extend piston rod 134 to engage follower wheel 138 within lead screw thread 62A.

As mentioned above, wire storing reel 36 stores the wire for later use in forming the filter support tubes. The rolls of pre-wound wire are commercially available in 1,000 pound rolls. The 1,000 pound rolls of wire are preferably about 36 inches O.D. and 16 inches I.D. and approximately 10 inches high. In production, these rolls are mounted in a vertical plane on the reel by means of a lifting device (not shown).

Referring now to FIG. 17, there is shown flow diagram of the operative steps of the method for making filter support tubes 10, such as by employing apparatus 22. At initial setup, as represented by block 186, the free end of wire 16 is connected to the left end of mandrel 28. Also, four plastic reinforcing strips 18 are installed in mandrel slots 228 and held therein by a spring closure (not shown) until wire 16 starts winding about mandrel 28 which will lock plastic strips 18 in position, permitting the spring closure to be withdrawn.

Drive power source 46 is activated to cause the concurrent rotation of mandrel 28 and lead screw 62. Block 188 represents the step of drawing wire 16 from reel 36 by the rotation of mandrel 28. Blocks 190, 192, and 193 represent the next steps of moving wire 16, first, through gas heater 38 for heating wire 16, second, through fluidized bed 40 for coating wire 16 with a powdered corrosion resistant material 20 which also serves as a bonding agent, and third, through gas heater 39 for again heating coated wire 16.

Block 194 represents the following step of winding the heated and coated wire 16 onto rotating mandrel 28 and about the straight plastic reinforcing strips 18 being held on mandrel 28. Once winding of wire 16 is completed and wire 16 is embedded in plastic reinforcing strips 18, block 196 represents the next step of manually cutting wound wire 16 and collapsing mandrel 28. Block 198 represents removing finished tube 10 from mandrel 28 over unsupported end 28B thereof. The steps are then repeated with the insertion of a new end of wire 16 in mandrel 28 and the installing of a new set of plastic strips 18 on mandrel 28.

It will be appreciated that the foregoing is presented by way of illustration only, and not by way of any limitation, and that various alternatives and modifications may be made to the illustrated embodiment without departing from the spirit and scope of the invention.

What is claimed is:

1. A filter support tube for a filter cartridge, comprising:
   a wire wound in a coiled configuration defined by a plurality of turns, said wire adapted to support a filter medium; and
   a plurality of reinforcing strips extending across said turns of said wire and spaced from one another;
   said turns of said wire extending transversely through and being embedded in said reinforcing strips such that said strips lock said turns of said wire in said coiled position.

2. The filter support tube of claim 1, wherein said wire includes a first end portion and a second end portion opposite said first end portion, wherein said turns of said wire at said opposite end portions are spaced closer to one another than said turns making up a middle portion of said wire extending between and connecting with said opposite end portions.

3. The filter support tube of claim 1 wherein said wire is externally coated with a bonding agent which bonds said wire to said reinforcing strips through which said wire is embedded.

4. The filter support tube of claim 1 wherein said wire is externally coated with a corrosion resistant material.

5. The filter support tube of claim 1 wherein said reinforcing strips are composed of a thermoplastic material.

6. A filter support tube for a filter cartridge, comprising:
   a wire wound in a helical configuration and defining a cylinder having a central longitudinal axis and a perimeter, said wire adapted to support a filter medium; and
   a plurality of reinforcing strips extending generally parallel to said longitudinal axis of said cylinder of said helical wound wire and circumferentially spaced from one another about said perimeter of said cylinder;
   said helical wire of said cylinder being embedded in and extending transversely through said reinforcing strips such that said strips lock said wire in said helical wound configuration.

7. The tube of claim 6, wherein said wire includes a first end portion and a second end portion opposite said first end portion, wherein said wire is composed of turns at said opposite end portions that are spaced closer to one another than turns at a middle portion of said wire which extend between and connect with said opposite end portions.

8. The tube of claim 6 wherein said wire is externally coated with a bonding agent which bonds said wire to said reinforcing strips through which said wire is embedded.

9. The tube of claim 6 wherein said wire is externally coated with a corrosion resistant material.

10. The tube of claim 6 wherein said reinforcing strips are composed of a thermoplastic material.

* * * * *